2,885,023

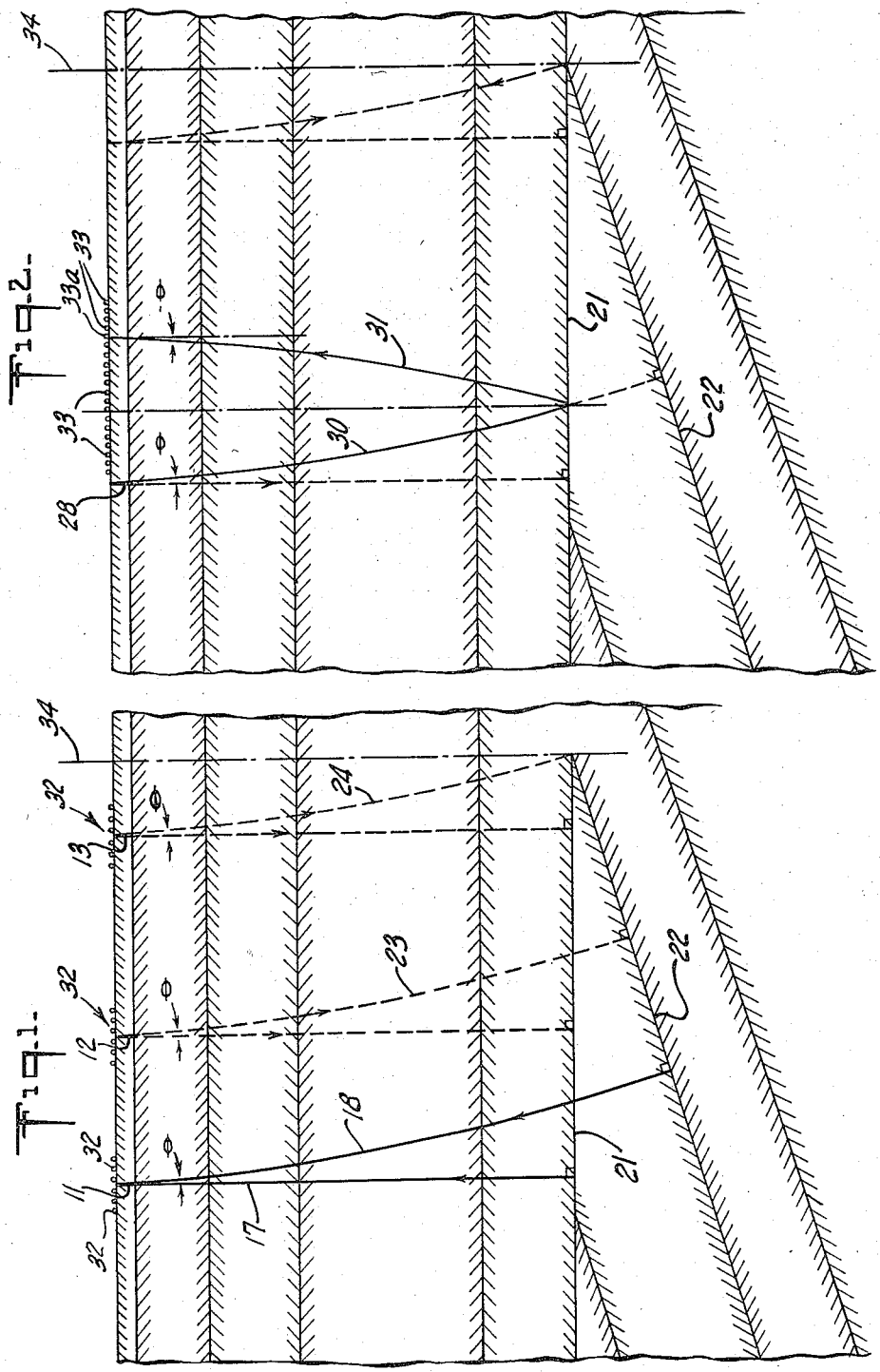

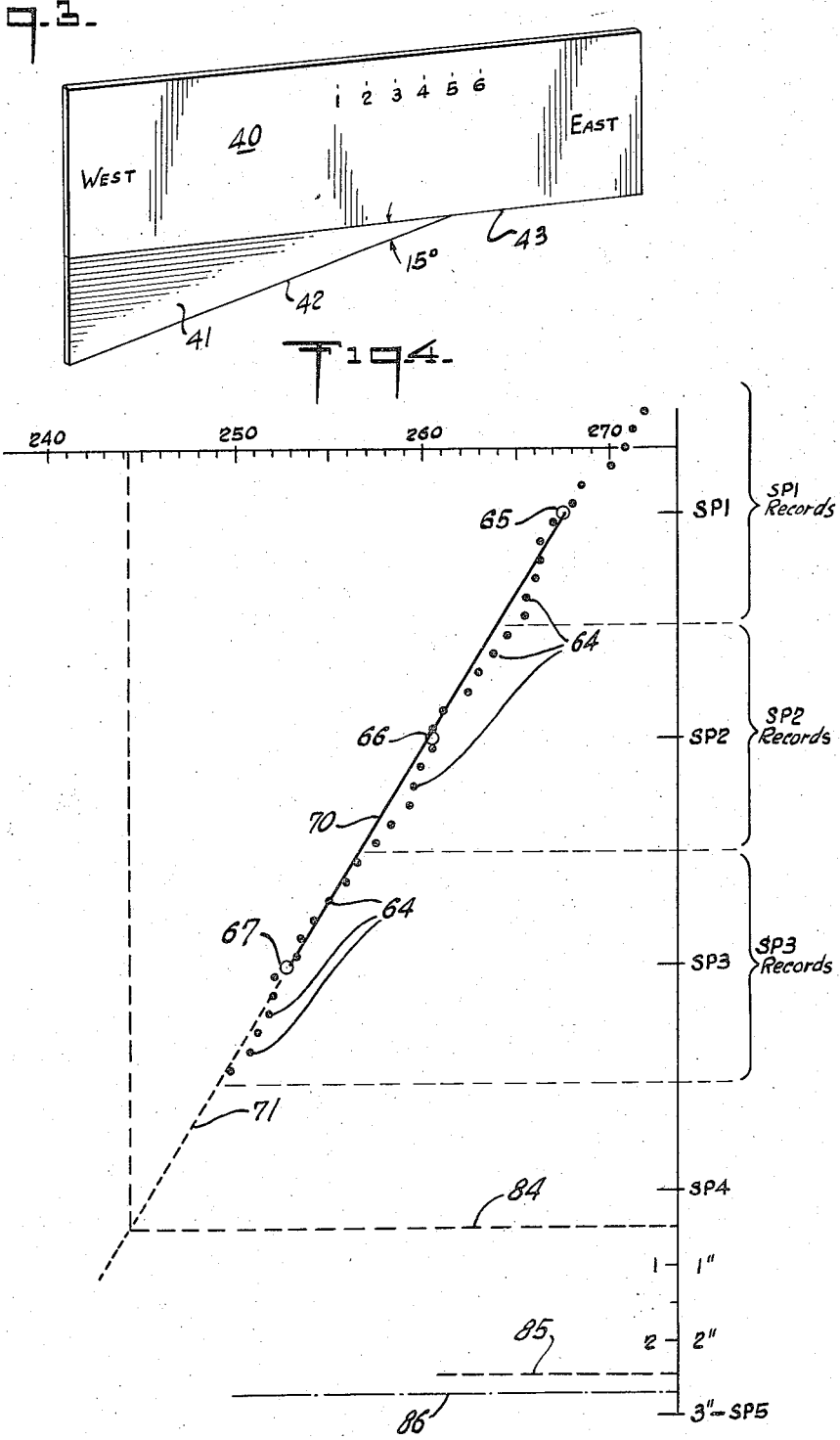

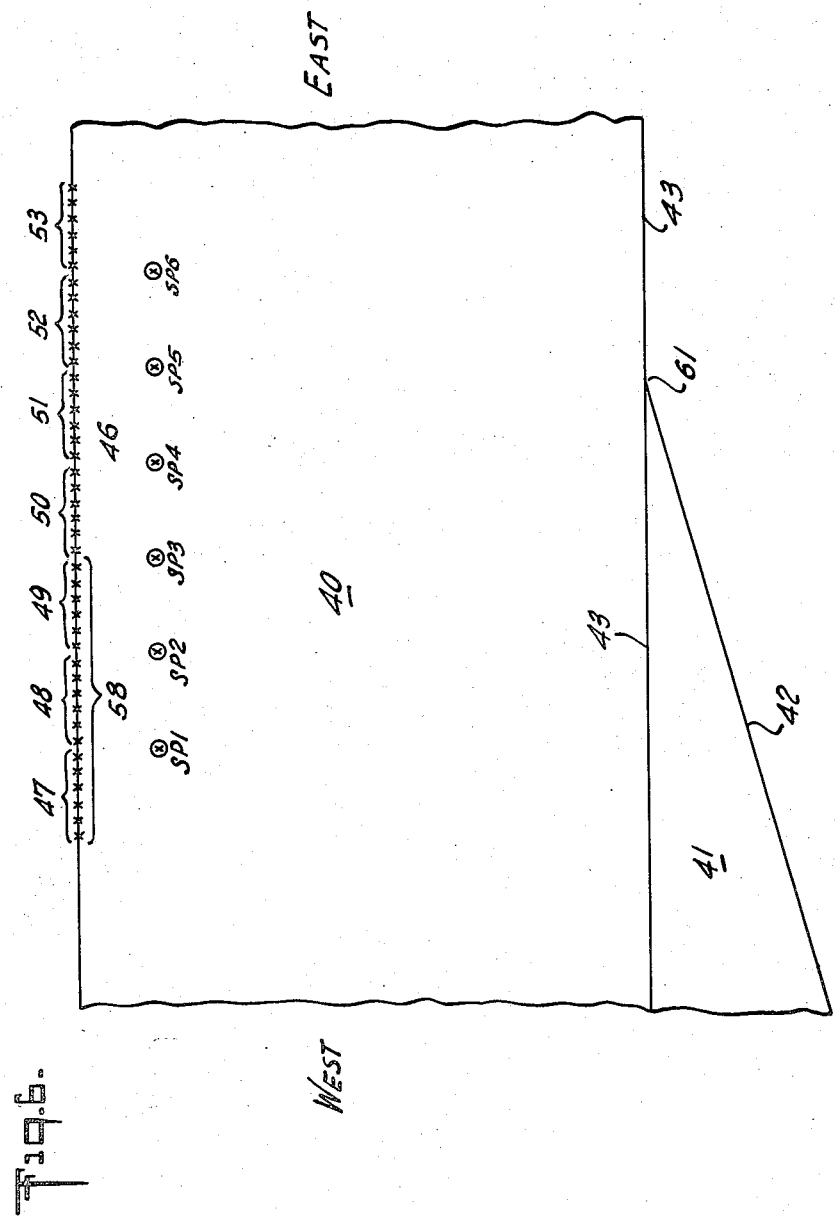

REFLECTION SEISMIC EXPLORATION METHOD

Hugh O. Walker, Jr., Houston, Tex., assignor to The Texas Company, New York, N.Y., a corporation of Delaware Application December 19, 1957, Serial No. 703,936

8 Claims. (Cl. 181—.5)

This invention is concerned with seismic exploration in general, and more specifically with reflection type of seismic exploration work involving a ray path comparison method.

The invention deals with the locating of the vertical projection of a "pinchout." In greater detail, the type of pinchout under consideration here is one that is the termination of a truncated sloping formation which is overlain by a horizontal bed or formation.

Heretofore, the location of a termination of a sloping formation, was limited to the procedure which involved making a contour plot, or map, of the sub-surface formations and thus locating in a general way where any such termination is located. Such procedure necessitated the use of seismic velocities in connection with seismic records, in order to determine the depth to any reflecting formation. Such velocities are either a mere guess, based on general information from a given area, or they may be more accurately assumed velocities, based on data from any deep wells that have been drilled in the vicinity. In either case, it is evident that the velocities employed are subject to considerable errors. Furthermore, it will be clear that the determination of where a sloping formation termination lies, involves considerable amounts of extrapolation of data so that the determination as to location of any indicated terminations, will of necessity be subject to quite considerable errors.

Consequently, it is an object of this invention to overcome the failings of the prior art by eliminating the use of seismic velocities altogether.

Another object of the invention is to provide a method for determining the location of termination of truncated sloping beds, which makes use of only the time data involved in connection with the taking of reflection records. Thus, the method according to this invention eliminates any need for using seismic velocity considerations at all.

Briefly, this invention involves a method that is useful in reflection seismic exploration. The method is one for locating the vertical projection of the termination of a sloping truncated formation, wherein such formation lies beneath a substantially horizontal reflecting formation. This method eliminates any consideration of seismic velocity; and comprises the generation of a pulse of seismic energy near the surface of the earth, at a plurality of locations spaced apart along a predetermined line in the vicinity of said termination. The method also comprises the step of making a record of each of said generated pulses including a reflection from said sloping formation. The records thus made include said reflected energy as received substantially at each of said locations. The method also comprises the step of making another record of a generated pulse of seismic energy in the same vicinity of said termination, including a reflection from said horizontal formation. The said last-named record includes said reflected energy as received at a distance from the point of generation of said last-named pulse, such that the emergent angle of the ray path of said reflected energy is the same magnitude as the emergent angle of the ray path of each of said reflections from said sloping formation.

The foregoing and other objects and benefits of the invention are set forth in greater detail below and are illustrated in the drawings in which:

Fig. 1 is a schematic cross-section view through a portion of the surface of the earth, illustrating certain ray paths in connection with certain steps of the invention in order to facilitate an understanding thereof;

Fig. 2 is another schematic cross-section view through the same section of the earth's surface as that illustrated in Fig. 1, and illustrates some other seismic energy ray paths in connection with certain other steps of the invention;

Fig. 3 is a perspective view showing the structure employed in carrying out model seismic experiments such as may be employed by way of illustrating the invention;

Figure 5:
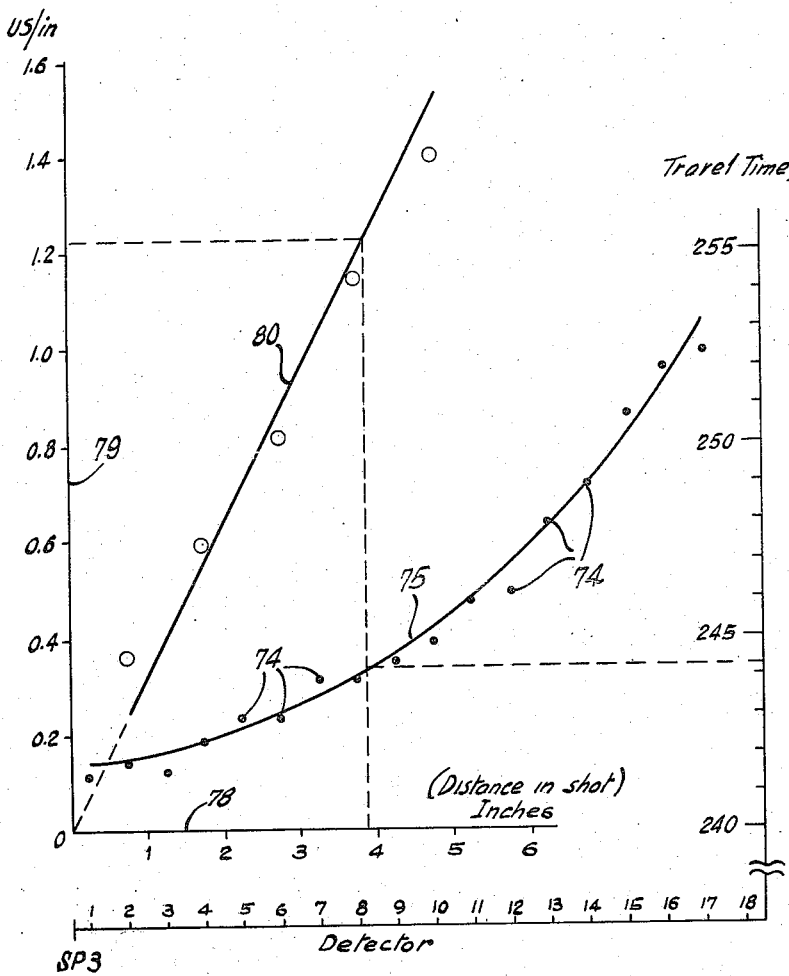

Fig. 4 is a graph showing shot point distance spacing along the vertical axis, and travel time along the horizontal axis, and illustrates a specific example carried out in connection with the Fig. 3 model apparatus Fig. 5 is a compound graph showing detector distance spacing along one horizontal axis with travel time along the corresponding vertical axis, for one graph; while on the other graph, distance corresponding with the detector spacing is shown along the other horizontal axis, and slope in terms of travel time per unit distance, is shown along the vertical axis for the other graph; and Fig. 6 is an enlarged detail schematic showing of the model equipment illustrated in Fig. 3, indicating the detector spreads employed.

In order to help understand this invention, it may be pointed out that it is based upon the laws of reflection and refraction as derived from Fermat's principle.

Furthermore, a general understanding of the known techniques for carrying out reflection seismic exploration is necessary for a good understanding of this invention. Such reflection seismic exploration techniques are old and well known so that they are completely familiar to anyone skilled in the art. However, as a quick résumé, such reflection seismic techniques may be described as follows:

A line along which it is desired to determine a seismic profile is determined in advance, and then a series of relatively shallow seismic shot holes will be drilled, spaced apart along this line. Following this, the operation for obtaining seismic records having reflections thereon, includes in general the operation involving placement of a plurality of detectors, spaced apart singly, or in groups, along the predetermined line where shot holes have been drilled. The placement of such detectors is ordinarily made adjacent to a given one of the shot holes at the time when a charge of explosive is detonated in such shot hole. This spread will usually be arranged so that some detectors are located on both sides of the shot hole when a shot is taken. However, sometimes the procedure used is that of employing detectors over a total spread which extends just beyond each of a given adjacent pair of shot holes. Then a shot is detonated in each of these two shot holes for such detector spread. A progressive set of records may be made, by moving the detector spread forward along the predetermined line where the shot holes are located, with a pivoting about the closest detectors at each shot point in order to create (on successive records) at least one trace that is substantially the same for each direction of detector spread. In this manner, the combined records taken from any one given shot point, are the two detector spreads, both behind and in front of the shot point (speaking in terms of the direction in which the shot points are being successively fired). These, then may be combined to provide reflection data that straddles such shot point.

It is not always done with such pivoting about close detectors. Sometimes two spreads are made, one on either side of the shot point, with the closest detectors of each spread spaced equal distances on opposite sides of the shot point. These two spreads likewise are used to provide records which together straddle the shot point.

Another method of operating employs a so-called split spread, in which the group of detectors are spread out directly across the shot point so that an equal number of detectors lies on either side thereof. In this manner, when the shot point is fired and a record is taken, the reflection data recorded straddles the shot point and provides information such that the time of arrival of reflected energy directly at the shot point, is indicated.

The technique of making records to indicate the return of reflected seismic energy from any subsurface strata may involve the use of many different types and styles of equipment. Basically, all such equipment includes a plurality of geophones, or detectors, which are placed along the surface of the earth and which act to transform the seismic waves received, into electrical signals. These electrical signals are then amplified and operated on by various circuit elements such as the necessary automatic gain control circuits, after which they are fed to some type of recording apparatus in order that a permanent record may be made of the signals as received at the time when the explosive charge was detonated. These records all include some means for determining exactly the time when the explosive charge was detonated, and also for determining the length of time thereafter that expire prior to the receipt of signals created by the return of reflected seismic energy. It is of course clear to anyone skilled in the art that it is necessary to employ a plurality of detectors spaced apart along any given line on the surface, in order to be able to recognize (with any degree of certainty) the existence of a reflection as it makes itself felt at these detectors individually.

All the foregoing general teachniques, that are involved in seismic reflection exploration work, are old and well-known in the art and consequently no further explanation thereof need be made.

Referring to Fig. 1, it will be observed that schematically there is illustrated a plurality of shot points 11, 12 and 13. It will be understood that these are merely the locations where seismic energy is generated, near the surface of the earth. It will be understood that such energy travels outward from such point of generation in a spherical path which includes illustrated ray paths 17 and 18 for the shot point 11. The energy traveling along these ray paths, i.e., paths 17 and 18, will travel downward and be reflected back along the same ray path in each case to return to the point of origin of the seismic energy. It will be noted that ray path 17 illustrates that path for energy which is reflected from a horizontal reflecting formation 21 while the energy traveling over ray path 18 is reflected from a sloping formation 22. These illustrated ray paths 17 and 18 are the paths of travel for the seismic energy which is reflected from formations 21 and 22 respectively, at right angles in each case. This is so because any seismic energies not reflected at right angles will not return over the same ray path since it will diverge, after reflection, from the path traveled on the way down to the reflecting formation.

It will be noted that there is an angle θ, indicated on the drawing, which is the emergent ray angle for the ray path 18. It will be observed that the same emergent ray angle θ exists at another shot point further up the slope of formation 22, e.g., at shot point 12, since the energy traveling over a ray path 23 takes the same angular path as ray path 18. This is because of the geometry involved. Furthermore, the same emergent ray angle θ must exist for a ray path 24, in connection with the shot point 13 which is situated such that the energy traveling over ray path 24 is reflected from the termination point of the truncated formation 22.

It is pointed out that some of the energy traveling downward along ray paths 18 and 23 will be reflected from the horizontal formation 21 to return to the surface at a point spaced some distance away from the shot point, in each case. For example, see Fig. 2.

Referring to Fig. 2 it will be observed that from any given shot point along the seismic profile line being employed, e.g., a shot point 28, there will be a ray path 30 which is identical with the upper portion of a ray path for energy reflected at right angles to the sloping formation 22 (above the horizontal formation 21). In addition, the energy reflected from horizontal formation 21, which has traveled over the ray path 30, will return to the surface over a ray path 31. Also this energy (ray paths 30 and 31) will have an emergent ray angle equal in magnitude to angle θ, because of the symmetry involved in such reflections.

It will be observed that there is illustrated at each of the shot points 11, 12 and 13, a plurality of detectors 32 which extend across the shot point location in each case. This is the usual arrangement for taking a so-called "split spread" record, such that half of the number of detectors employed are spaced on one side of the shot point and the other half on the other side. In this manner, the reflected energy recorded by means of the usual recording equipment that is connected to the detectors 32, may be interpreted to obtain the data representing a ray path of seismic energy which includes the point of origin, or the shot point, even though no detector 32 is placed directly on top of the shot point.

It will be observed also that there is illustrated at the shot point 28 a plurality of detectors 33 which extend outward from the shot point 28 along the line that is employed for the reflection profile being considered. This arrangement is a so-called range spread, and the data may be taken by using a sufficient number of detectors 33 to make a single spread that extends far enough to receive the reflected return energy which follows the ray path 31 illustrated. This distance will not be known in advance, so that an ample spread must be used. It will be understood, however, that the same results could be obtained by making a plurality of successive spreads of detectors 33 (while taking a record with each such spread and combining the results of these records to obtain the travel times for reflected energies being received which emanate from the shot point 28). In either case, the reflected energy recorded will be carried out away from the shot point 28 far enough so that one of the detectors 33a will receive or be close to, the energy being propagated along the ray path 31. The number of detectors 33 employed will be sufficient to extend beyond this point so that the reflected energy recorded may be interpreted to obtain the data representing such ray path.

Now, the results of obtaining reflected energies from the sloping formation 22; are matched with the reflected energies as received from the horizontal formation 21 by means of the range spread, and the location of the shot point 13 on the surface of the earth may be determined. When this has been determined, it is merely necessary to take half of the distance from shot point 28 to the point where emergent ray path 31 is located on the surface, and add this distance from shot point 13 on the surface, in the proper direction to accurately locate the vertical projection of the termination point of sloping formation 22. Such vertical projection is indicated in the drawings by a dashed line 34.

In view of the above, it will be apparent that the steps involved in carrying out a method according to this invention, include (1) the generating of a pulse of seismic energy near the surface of the earth at a plurality of locations (e.g., shot points 11 and 12) spaced apart along a predetermined line in the vicinity of a sloping formation termination, (2) the making of a record of each of the generated pulses, which record includes a reflection from the sloping formation. Such records include energy data from both sides of the shot point so that the reflected energy received substantially at the shot point is effectively included, (3) the generating of an additional pulse of seismic energy located in the vicinity of the termination of the sloping formation, and (4) making another record that includes reflected energy being returned from the horizontal formation which overlies the sloping truncated formation and which energy returns to the surface with an emergent ray angle equal in magnitude to the ray angle of the earlier recorded reflection which returned from the sloping formation to the point of origin in each case.

Then when the above indicated steps have been carried out, including a timing (which is incidental to the making of such records) of the reflected energy travel in each case; appropriate calculations may be made for determining both the distance from the shot point to the point of reflected energy having the equal emergent ray angle (reflected from the horizontal formation), and the location along the surface of the earth of a shot point where a travel time of energy reflected at right angles from the sloping formation, would be equal to the travel time for the reflected energy having the equal emergent ray angle and being reflected from the horizontal formation. Therefore, the exact location of the vertical projection of the termination point may be accurately determined.

It will be noted that the seismic energy generated at shot points 11, 12, 13 and 28 may be carried out by different types of seismic energy generators. However, the most effective and usual seismic energy generator employed in reflection seismograph operation is that of detonating a high explosive which is located in a relatively shallow hole and tamped with water or the like to provide a high level of seismic energy having a short duration. Consequently, the location of such seismic energy generators is usually referred to as a shot point. Thus, it will be understood that various other sources of seismic energy could be employed while carrying out the method according to this invention.

It will be appreciated, that the location of the predetermined line mentioned in the steps set forth above, may often be merely the location of a seismic profiling line that is employed in making a series of seismic reflection profile records. Then when the records are studied and reflections are noted detecting a sloping formation that lies beneath a horizontal formation, the further steps of this invention may be carried out in order to make a determination as to the location of the termination of the sloping formation.

It is pointed out that the direction of the spread or line along which detectors 33 are located, may be in either direction from shot point 28 so long as it lies substantially parallel to, and substantially in the same vicinity as the profile line of shot points 11, 12 and 13 illustrated in Fig. 1. However, it is probably preferable to employ the direction of spread for detectors 33 which corresponds to the sequential direction of the line of split spread records taken from shot points 11, 12 and 13 as they approach the location of the termination of sloping formation 22 where it intersects or is truncated by formation 21. Under favorable conditions, the direction taken by the detector 33 spread from the shot point 28, would not matter; but to be sure that the ray paths under consideration actually coincide, the same profile line should be used.

Figs. 3, 4, 5 and 6 example

Referring to Figs. 3 through 6, an illustrative example in connection with this invention will be described.

This example deals with the actual carrying out of procedures in accordance with this invention, by means of employing laboratory model equipment. Such laboratory equipment is generally well known and employs sheet materials to simulate a cross-section of the earth's surface and subsurface. This has been found to be quite reliable in providing accurate analogous results that compare favorably with actual seismic reflection exploration work carried out in the field.

Thus, in the present illustrative example, referring to Figs. 3 and 6, there is employed a sheet of one-sixteenth inch brass 40, that has a one-sixteenth inch sheet of aluminum 41, securely fastened in contact with the lower edge of the brass sheet 40, as illustrated. Aluminum sheet 41 is cut to provide a lower edge 42 that lies at an angle of fifteen degrees relative to the bottom edge of brass sheet 40. Thus, the model represents a sloping formation 42 that has an overlying horizontal formation in the form of a lower edge 43 of the brass sheet 40.

For the purposes of relative orientation in connection with the results of model experiments, the brass sheet 40 has been given designations east and west on either end thereof, indicating an arbitrary orientation for the model structure during the carrying out of seismic experiments. It will also be noted that there is indicated on the surface of the brass sheet 40, locations SP1 through SP6 which are in fact the points where seismic transducers are located to represent shot points in making seismic reflection recordings.

The carrying out of model seismic work closely parallels actual field operations with the major difference being the time factor. In the field with actual seismic operations the distances involved in seismic energy travel are relatively great so that the travel time involved is in the order of magnitude of seconds. In model seismic work, however, the distances involved are such that the travel time is usually in the order of a few hundred microseconds. The model work therefore makes use of a cathode ray tube in connection with displaying and recording the results of generating seismic energy and observing the results obtained. A technical paper was presented by the applicant to the Society of Exploration Geophysicists at a meeting held near the end of October 1956 in New Orleans, Louisiana, which described the details of how such model work is carried out. However, for the purposes of this disclosure it is adequate to know that a plurality of miniature detectors are placed along the upper edge of the sheet adjacent to the location of a transducer, so that every time the transducer is pulsed the energy received thereafter by the detectors may be individually observed in the form of a separate trace corresponding to each detector. Thus the results of the model work are quite exactly analogous to actual field work of the same nature.

Referring to Fig. 6 for greater detail of the model layout, it will be noted that in the carrying out of an illustrative example for this invention, the above-mentioned six shot points are located a predetermined distance below the "surface," i.e., the top edge of the brass sheet 40. In making records of the seismic energy transmissions, six detectors are employed which are schematically indicated in Fig. 6 by the small $x$'s (having reference numeral designation 46) at the "surface" edge of the sheet 40. In carrying out the making of reflection records, the six detectors 46 are placed successively at the positions indicated by the brackets, so that a split spread record from shot point 1 is completely made after having made two separate records. One of these two are made with a group of the detectors 46, located as indicated by a bracket 47. And the second record is made after the detectors 46 have been moved to the positions indicated by a bracket 48, on the other side of the shot point 1. This same procedure is carried out for each of the shot points 1 through 6, so that shot point 2 is energized for providing two records, one received by the group 48 of detectors 46, and the other by detectors 46 when placed in the locations indicated by a bracket 49. Thus, in each case a pair of records are made for each shot point, and brackets 49 and 50 represent the locations of the detectors 46 for records taken from shot point 3; while similarly brackets 50 and 51 indicate the detector positions for shot point 4 and brackets 51 and 52 for shot point 5, and finally brackets 52 and 53 for shot point 6.

There is a bracket 58 shown, which encloses the positions for eighteen of the detectors 46. These eighteen detector positions are those employed in connection with the taking of a ranging set of records from the shot point 3. As actually carried out, these ranging records comprised three separate recordings, one for each location of six of the detectors 46; while the seismic energy generated in each case, was carried out by the one transducer located at shot point 3. Thus, reflection records were made which provided the indication of seismic energies as received by three groups of the detectors 46 (49, 48 and 47), which energies emanated from shot point 3. The reflected energy portions of these records traveled downward to the reflecting formations, i.e., the lower edges 43 and 42 of the model, and back.

It will be clear that the model equipment is representative of a horizontal reflecting formation 43 which overlies a truncated sloping reflecting formation 42. The actual point of truncation of sloping formation 42 may be directly measured on the model equipment and was found to be at a point 61, which was located 0.31" to the west of the location of shot point 5. The shot points 1 through 6 were laid out exactly three inches apart, and two and one-half inches down from the surface (i.e., top edge of the sheet 40). The detectors were placed on the upper edge of sheet 40 with one-half inch spacing between detectors, and laid out with the closest detector to the shot point in each case at one-quarter inch from the vertical projection point above the shot point. Thus, each spread 48 through 52 of detectors 46 was employed to make two records, while spreads 47 and 53 at the ends were only employed for one record each. In this manner each shot point was shot twice to provide the same data as would be obtained by a split spread, such as described above with detectors spread out on both sides of the shot point.

With the above-indicated dimensional aspects of the model equipment in mind, an explanation of the procedure for correlating the data as determined using actual records made by photographing a cathode ray oscilloscope display and thus locating the termination point by means of a method according to this invention, may be explained.

*Locus of travel times for energy reflected at right angles to the sloping formation*

Referring to the graphs, and first of all to Fig. 4, it will be observed that there is shown a group of plotted points 64 which have been taken from the results of making actual records from the model equipment, by in effect "shooting" shot points 1, 2 and 3, with detector spreads continuing across all three shot points. It will be observed that the vertical axis of the Fig. 4 graph shows displacement positions for the shot points, and thus this displacement scale is employed in making plotted points 64. The horizontal scale employed represents time in microseconds. This is the time scale employed in model seismic work, so that the dimensions of the model equipment may be kept to a workable size.

The plots of points 64 on the Fig. 4 graph were made from actual records, made on the model equipment, with detectors located at the illustrated locations indicated by brackets 47, 48, 49, and 50 of Fig. 6. These plots are determined from the model records in the same way as would be done with ordinary field equipment, by observing reflected energies as received on each trace of the records and noting the time interval following the instant when the seismic energy was generated. The reflections being plotted were those from the sloping formation 42. These may be recognized by observing the proximity of the reflections from the horizontal formation 43.

It is pointed out that the vertical axis plot, for the points 64, represents the mid-position between the detector that produced the trace and the shot point in each case. Consequently there are twelve points 64 between each pair of shot points, six for the traces made on each record. There is one record made from each shot point with six traces on the record.

In carrying out the procedure, records were taken for the complete spreads of detectors across all six shot points. However, plotted points 64 were not continued beyond the easterly spread adjacent to shot point 3 for the reason that the picking of reflected energy return on each trace became no longer valid beyond this point, by reason of the interference between reflections being received from the two reflecting formations 42 and 43.

Three additional plotted points 65, 66 and 67 have been shown on the graph of Fig. 4. These represent the plots of reflected energy that was received directly at the vertical projection point above each shot point. These points 65, 66 and 67 were located by finding the mid point between the two plotted points 64 next adjacent to the shot point location, in each case. A line 70 has been drawn connecting the three points 65, 66 and 67 and has been extended as illustrated by the dashed line 71. This line 70 extended represents the locus of travel times with respect to shot point locations, for reflected energy that has returned directly to the point of origin, from the sloping formation 42. As explained previously, this reflected energy which returns to the point of origin is that which has been reflected from the sloping surface, at right angles thereto.

The reflections that are received from the sloping formation 42 may be recognized by their step-out as well as by their proximity to the reflections that are present on the same records which have been reflected from the horizontal formation 43.

*Ranging record of reflections from horizontal formation*

As will be recalled from the previous disclosure, one of the steps of the method involves taking a ranging record which extends far enough to include a reflection which has the same emergent ray angle as the emergent ray angle for any reflections being received that were reflected at right angles to the sloping formation 42. This ranging record was carried out with the model equipment, from shot point 3, employing three spreads of six of the detectors 46 each, as indicated by the bracketed group 58 in Fig. 6.

The results of this ranging set of records are plotted on the Fig. 5 graph, where a plurality of plotted points 74 were made from traces on the actual records made with the model equipment; in which the shot point 3, was, in effect, "shot" three times with the six detectors located at positions corresponding to the bracketed locations 49, 48 and 47, successively. The eighteen detectors were laid out wtih the spacing as already indicated above, which is indicated along the horizontal axis at the bottom of Fig. 5. The travel time was noted from the records for each trace, in the same manner as indicated above, and was read in terms of microseconds as is indicated on the vertical scale (right hand side) of the Fig. 5 graph. The reflections being plotted were those from the horizontal formation 43. A smooth curve 75 was drawn through the plotted points 74. This curve 75 has a slope which increases with the increase in distance away from the shot point 3, since the travel time increases in proportion to twice the added distance of travel by reason of the total reflected path which includes both down and back travel of the seismic energy reflected.

*Determining sloping formation termination point*

Now it may be shown that the slope of curve 75 is proportional to the emergent ray angle of the reflected energy from the horizontal formation 43. Similarly, the inverse slope of line 70 in Fig. 4 is also proportional to the emergent ray angle for its reflected energies. This may be expressed mathematically as follows:

$$\sin \theta = \frac{V_o \Delta t}{2 \Delta x}$$

or $$\frac{\Delta t}{2 \Delta x} = \frac{1}{V_o} \sin \theta$$

where
$\theta$ = emergent ray angle,
$V_o$ = surface velocity,
$\Delta t$ = time difference of ray path travel times,
$\Delta x$ = distance between ray paths considered, taken along the surface.

It will be noted that the velocity term is a constant of proportionality in both cases, so that it can be eliminated.

Since the above relationship stands, it will be appreciated that the location of the point along curve 75 (of Fig. 5) where the slope is equal to the inverse slope of curve 70 (of Fig. 4), will be the location of a ray path such that the seismic energy which would be reflected from the sloping formation 42 at right angles thereto (i.e., back to the shot point 3) would follow an identical path with the first half of that seismic energy that is reflected from the horizontal formation 43 and returned to the horizontal location of such point along the ranging spread.

In order to determine the above-indicated conditions, i.e., to find the point along curve 75 where its slope is equal to the inverse slope of curve 70 of Fig. 4, the following procedure may be carried out:

A graph plot may be drawn as illustrated in Fig. 5, which has a horizontal axis 78 thereof calibrated in inches and placed to correspond, as to its zero point, with the shot point 3 location on the horizontal axis for the other graph illustrated in Fig. 5. The vertical axis of this additional graph on Fig. 5 is drawn at the left side of the graph and has a reference numeral 79 applied thereto. This axis of the additional graph is calibrated in terms of the slope for curve 75. Therefore, this calibration is in figures which represent micro-seconds per unit displacement, which in this instance is taken as an inch.

Curve 80 is the result of plotting points representing the slopes of curve 75 at given displacement points therealong, and directing an average or fitted line thereon. Now, by making observations and calculations from the Fig. 4 graph, an inverse slope for line 70 may be determined in terms of micro-seconds per inch, and this will be determined to be 1.23 micro-seconds per inch, for the conditions as carried out in this illustrative example. Therefore, taking the slope of 1.23 on the vertical axis of the Fig. 5 slope graph 80, and reading the displacement position along curve 75 where this slope exists; we find that the position indicated is close to the four inch point on the horizontal axes of Fig. 5 graphs. Furthermore, the travel time for this point along curve 75 (where the slope is 1.23) may be observed to be 244.25 micro-seconds.

Now it has been determined that the reflected energy which emanated at shot point 3 and was reflected from horizontal formation 43, and had an emergent ray angle equal to the emergent ray angle for reflected energies at right angles to the sloping formation 42, was received along the ranging spread at a point close to the eighth detector 46, counting westward from shot point 3 (see the lower horizontal axis of Fig. 5). We have consequently determined the distance along the surface which is to be divided in half for determining the distance from the shot point to the subsurface reflection point from the horizontal formation (e.g. Fig. 2).

Next, it is merely necessary to determine the location of the theoretical shot point, e.g., shot point 13, Fig. 1, where the ray path for energy reflected back to the shot point from sloping formation 42 at the termination point thereof, would be located. This may be accomplished by referring back to the graph of Fig. 4 and noting that the travel time which was determined from Fig. 5 (244.25 micro-seconds) will give a displacement reading which corresponds thereto, as indicated by a horizontal dashed line 84 of Fig. 4. It will be observed that this point lies between shot points 4 and 5, at a distance of 0.49" east of shot point 4. Now the quantity 1.95" (which is one-half of the spread distance for the reflection from horizontal formation 43 that had the equal emergent ray angle), may be added to the position (line 84) of this theoretical shot point, in an easterly direction (since this is an upslope); and the vertical projection of the termination point of sloping formation 42 will have been thus determined.

Referring to Fig. 4, it is pointed out that the results of carrying out an actual example in accordance with the above description, provided the indication that the vertical projection of the termination point in question was located at 2.44" east of shot point 4. This is shown on the graph by a dashed line 85. This may be checked out against the physical measurement location of this termination point, which was 2.69" east of shot point 4, as illustrated by a long and short dashed line 86. Consequently, the error was 0.25", and this is of sufficiently small magnitude that it was found in keeping with the accuracy that was had in measuring the time on the records, as taken during this illustrative example.

Thus, it will be observed that a seismic method is provided for accurately locating the termination of a sloping bed overlain by a horizontal bed, without the necessity for employing any seismic velocity data whatever.

Although the embodiments described herein deal with only horizontal formations lying over a sloping truncated formation, it is contemplated that other structural conditions might fall within the scope of this invention and suggest themselves to anyone skilled in the art.

While an illustrative embodiment of the invention has been set forth above in considerable detail in accordance wtih the applicable statutes, this is not to be taken as in any way limiting the invention but merely as being descriptive thereof.

It is claimed:
1. In reflection seismic exploration, a method of locating the vertical projection of the termination of a sloping truncated formation lying beneath a substantially horizontal reflecting formation, which eliminates any consideration of seismic velocities, comprising generating a pulse of seismic energy near the surface of the earth at a plurality of locations spaced apart along a predetermined line in the vicinity of said termination, making a record of each of said generated pulses including a reflection from said sloping formation, said records including said reflected energy as received substantially at each of said locations, making another record of a generated pulse of seismic energy in the same vicinity of said termination including a reflection from said horizontal formation, and said last named record including said reflected energy received at a distance from the point of generation of said last named pulse such that the emergent angle of the ray path of said reflected energy is the same magnitude as the emergent angle of the ray path of each of said reflections from said sloping formation.

2. In reflection seismic exploration, a method of locating the vertical projection of the termination of a sloping truncated formation lying beneath a substantially horizontal reflecting formation, which eliminates any consideration of seismic velocities, comprising generating a pulse of seismic energy near the surface of the earth at a plurality of locations spaced apart along a predetermined straight line in the vicinity of said termination, making a record of each of said generated pulses including a reflection from said sloping formation, said records including said reflected energy as received substantially at each of said locations, making another record of a generated pulse of seismic energy in the same vicinity of said termination including a reflection from said horizontal formation, said last named record including said reflected energy received at a distance from the point of generation of said last named pulse such that the emergent angle of the ray path of said reflected energy is the same magnitude as the emergent angle of the ray path of each of said reflections from said sloping formation.

3. In reflection seismic exploration, a method of locating the vertical projection of the termination of a sloping truncated formation lying beneath a substantially horizontal reflecting formation, which eliminates any consideration of seismic velocities, comprising generating a pulse of seismic energy near the surface of the earth at a plurality of locations spaced apart along a predetermined straight line in the vicinity of said termination and extending at least over the location of said termination, making a record of each of said generated pulses including a reflection from said sloping formation, said records including said reflected energy as received substantially at each of said locations, making another record of a generated pulse of seismic energy along the same straight line including a reflection from said horizontal formation, said last named record including said reflected energy received at a distance from the point of generation of said last-named pulse such that the emergent angle of the ray path of said reflected energy is the same magnitude as the emergent angle of the ray path of each of said reflections from said sloping formation.

4. A ray path comparison method of seismic reflection exploration wherein a sloping formation is truncated at an overlying horizontal formation, comprising the steps of generating seismic waves and taking a plurality of timed records along a predetermined line on the surface of the earth, said records including reflections from said sloping formation as received on both sides of the points where said seismic waves are generated, taking at least one timed record of seismic waves generated near the surface of the earth in the vicinity of said plurality of records, said last named record including reflections from said horizontal formation and extending outward from the generation point of said seismic waves at least to the extent such that the emergent ray angle of those of said first named reflections from the sloping formation which are reflected at right angles to the sloping formation, whereby the locus of travel times for those of said first named reflections which are reflected at right angles to the sloping formation may be extended to include the travel time for that reflection from said one timed record where the emergent ray angle equals the emergent ray angles of all of said right angle reflections from the sloping formation, and consequently the vertical projection of the termination of said sloping formation may be accurately determined.

5. A ray path comparison method of seismic reflecttion exploration in accordance with claim 4 wherein said seismic waves are generated by detonating an explosive charge.

6. A ray path comparison method in accordance with claim 5 wherein said predetermined line is straight and lies generally across the termination line of said sloping formation.

7. A ray path comparison method in accordance with claim 6 wherein said one timed record includes reflections taken along the same said predetermined line.

8. A ray path comparison method in accordance with claim 7 wherein said one timed record includes reflections taken along the same said predetermined line and in the direction toward said termination of the sloping formation.

No references cited.